(No Model.)
G. W. ALLEN.
COTTON CHOPPER.
No. 460,546. Patented Oct. 6, 1891.
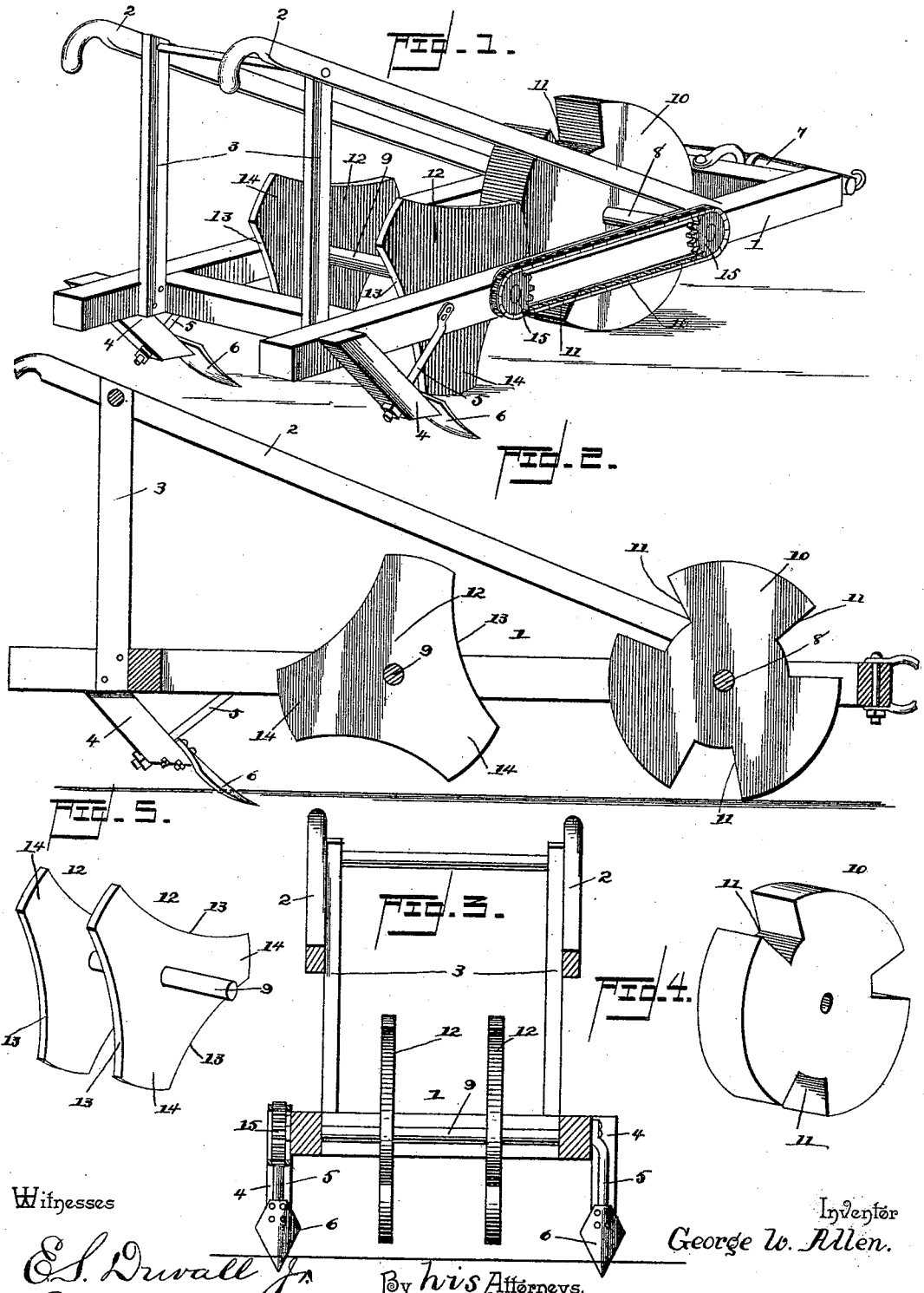
Witnesses
E. S. Duvall Jr.
Wm. Bagger
Inventor
George W. Allen.
By his Attorneys,
C. A. Snow & Co.

UNITED STATES PATENT OFFICE.

GEORGE WASHINGTON ALLEN, OF NEAR CORSICANA, TEXAS.

COTTON-CHOPPER.

SPECIFICATION forming part of Letters Patent No. 460,546, dated October 6, 1891.

Application filed January 24, 1891. Serial No. 378,993. (No model.)

*To all whom it may concern:*

Be it known that I, GEORGE WASHINGTON ALLEN, a citizen of the United States, residing near Corsicana, in the county of Navarro and State of Texas, have invented a new and useful Cotton-Chopper, of which the following is a specification.

This invention relates to machines for thinning and cultivating cotton; and it has for its object to provide a device of this class which shall be simple in construction, durable, and effective in operation.

With these ends in view the invention consists in the improved construction, arrangement, and combination of parts, which will be hereinafter fully described, and particularly pointed out in the claims.

In the drawings hereto annexed, Figure 1 is a perspective view of a cotton chopper and cultivator constructed in accordance with my invention. Fig. 2 is a longitudinal sectional view of the same. Fig. 3 is a vertical transverse section. Fig. 4 is a detail view of the cutting-disk. Fig. 5 is a detail view of the revolving fender.

Like numerals of reference indicate like parts in all the figures.

The frame of my improved cotton-cultivating apparatus is preferably rectangular in shape; and it may be constructed of wood, iron, or any other suitable material. The said frame, which in the drawings is designated by 1, is provided with handles 2 2, the lower ends of which are secured to the side pieces of the frame and the upper rear ends of which are connected by braces 3 with the rear ends of the side pieces of the frame. Said side pieces are also provided at their rear ends with downwardly-extending standards 4, connected with the side pieces by inclined braces 5. At the lower ends of the standards 4 are secured the cultivator-blades 6. A whiffletree 7 for the attachment of the draft is secured at the front end of the frame.

The frame 1 is provided with bearings for transverse shafts 8 and 9, which are arranged parallel to and one in advance of the other. Suitably mounted upon the front shaft 8 is a circular disk 10, which is provided at its rim or periphery with a suitable number of recesses or indentations 11, which are placed equal distances apart, a space of about eighteen inches being preferably left between said recesses. The latter are made tapering toward their lower or inner ends.

Suitably mounted upon the shaft 9 are the fender-plates 12 12, which are provided with curved recesses 13, forming the equidistant projecting arms 14. Said arms correspond in number and location to the recesses 11 in the disk 10, and the fender-disks 12 are so arranged that the arms 14 shall engage the ground at precisely the points where the recesses 11 of the disk 10 have previously engaged. The shafts 8 and 9 are provided at their ends, which project beyond one side of the frame, with sprocket-wheels 15, which are connected by a chain 16, so as to cause the said shafts to rotate in unison.

The operation and advantages of my invention will be readily understood from the foregoing description, taken in connection with the drawings hereto annexed. When the machine passes over the field, the rotary disk 10 is caused to engage the row of young plants. The latter will be crushed and destroyed by the action of the disk except at the points where the latter is provided with the recesses 11. At these points the row will be "cupped" and a stand of cotton will be left. The fender-disks 12, following in the wake of the wheel or disk 10, will be rotated in unison with the latter, and the fender-arms 14 will protect the sides of the stand of cotton while the cultivator-blades throw the dirt up against the row, thus preventing the young plants from being buried while the dirt is hilled up around them. The machine is exceedingly simple in construction and certain, as well as effective, in its operation, and it may be manufactured at a very moderate expense.

I have in the foregoing described what I consider to be the preferred construction of my machine; but it will be readily understood that minor changes may be made when desired, and I reserve the right to any such changes and modifications as may be resorted to without departing from the spirit of my invention.

Having thus described my invention, I claim and desire to secure by Letters Patent of the United States—

1. In a machine of the class described, the combination of the revolving disk provided with recesses at its periphery and a rotary shaft carrying fender-disks provided with arms registering with the recesses in the revolving disks, substantially as set forth.

2. In a machine of the class described, the combination of the revolving cupping-disk provided at its periphery with recesses or indentations, the fender-disks having curved recesses forming projecting arms that register with the recesses in the cupping-disk, and a chain connecting sprocket-wheels upon the shafts of the cupping-disk and fender-disks, substantially as and for the purpose set forth.

3. In a machine of the class described, the fender-disks mounted upon a revoluble shaft or axle and provided with curved recesses at their edges, said recesses forming the intermediate equidistant arms, substantially as and for the purpose set forth.

4. The combination of the frame having the standards provided with cultivator-blades, the shafts journaled in said frame and having sprocket-wheels connected by a suitable chain, the cupping-disk mounted upon the front shaft and having a series of equidistant recesses or indentations, and the fender-disks mounted upon the rear shaft and having arms registering with the recesses in the cupping-disk, substantially as and for the purpose set forth.

In testimony that I claim the foregoing as my own I have hereto affixed my signature in presence of two witnesses.

GEORGE WASHINGTON ALLEN.

Witnesses:
H. F. UNDERWOOD,
R. H. HERVEY.